United States Patent Office 3,442,736
Patented May 6, 1969

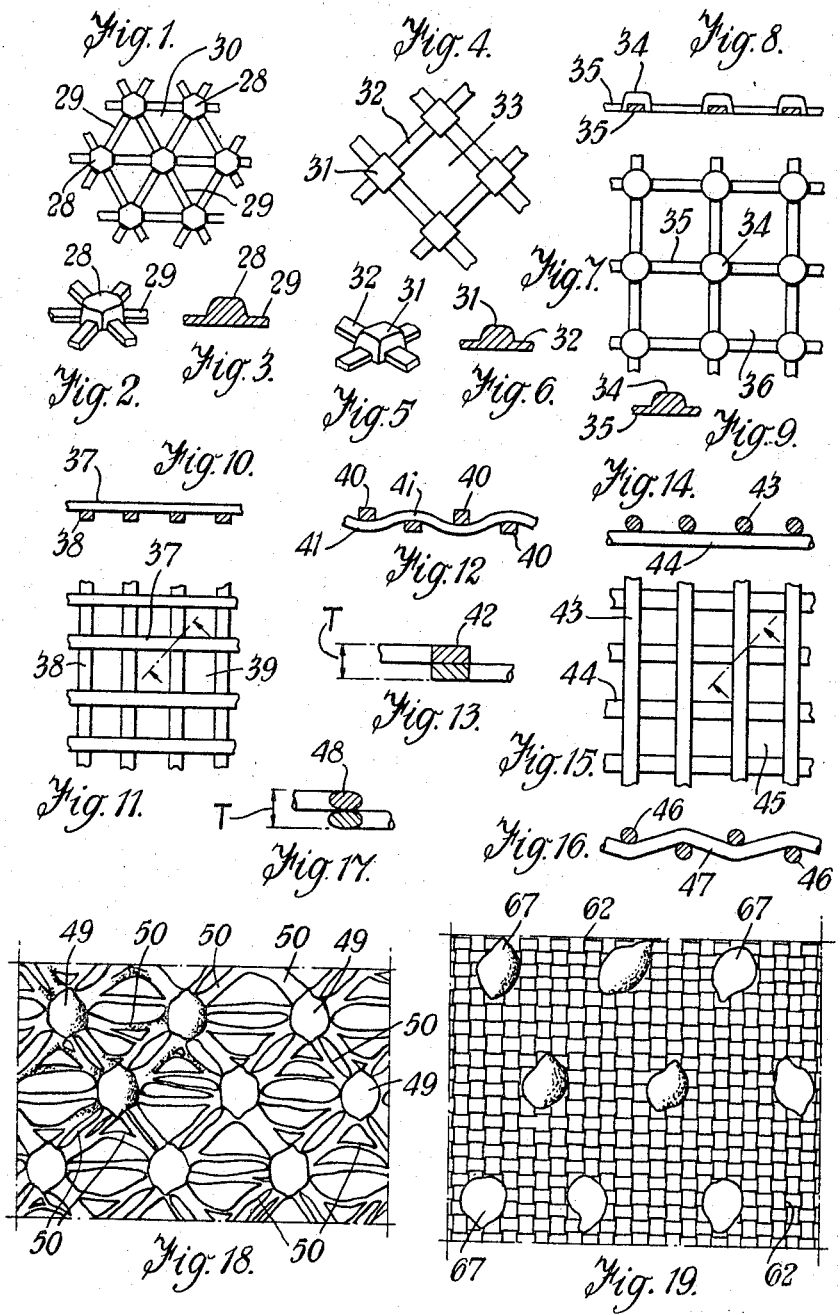

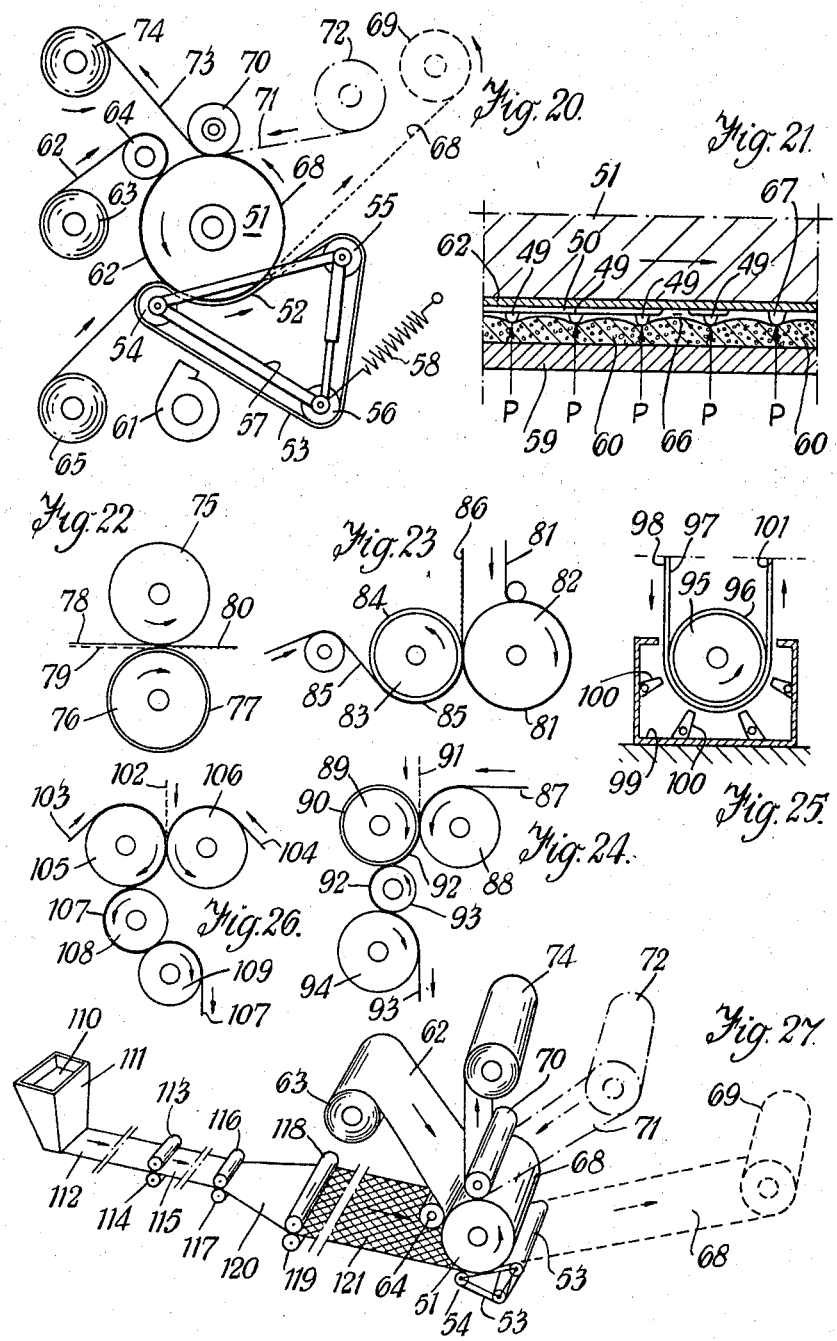

3,442,736
PROCESS FOR LAMINATING THERMOPLASTIC PARTICLES TO A SURFACE
John Duns, Welwyn Garden City, England, assignor to Smith & Nephew Plastics Limited, Hull, England, a British company
Filed Aug. 12, 1965, Ser. No. 479,270
Claims priority, application Great Britain, Aug. 17, 1964, 33,543/64
Int. Cl. B29c 27/12; B32b 5/10
U.S. Cl. 156—85
11 Claims

ABSTRACT OF THE DISCLOSURE

A method of producing a laminate article by placing one or two backing sheets in surface to surface relationship with an openwork thermoplastic net structure comprising a multiplicity of substantially uniformly spaced thick portions interconnected by thinner strand-like portions, pressing said backing sheet and net structure against each other with sufficient force to establish solid contact between said backing sheet and said thick portions of the net structure, and applying heat to cause fusion of said thick portions of the net structure with said backing sheet and at least partial disruption of said thinner portions of the thermoplastic net structure.

---

This invention relates to sheets, laminations and the like, adhesive methods and means, in which the sheets, laminations and the like preferably are flexible although they may be stiff, and has for its main object to provide means for applying an adhesive of thermoplastic material, in a novel arrangement and of a novel character, to one surface of a flexible or other sheet or lamination, to form a potentially adherable sheet or lamination, for instance a fusible interlining, ready when required to be united by pressure and heat with another flexible or other sheet or lamination, by the fusing of the thermoplastic material which is on one surface thereof; another object of the invention is to provide such adhesive-surfaced sheets or laminations; and a still further object is to provide sandwich laminates formed by such adhesive-surfaced sheets when united with another sheet or lamination.

For the formation of fusible interlinings it is usual to provide one surface of a suitable textile backing or lining with thermoplastic particles or coatings, and for the same purpose it has also been proposed to place a film of polyethylene with uniformly spaced perforations of desired shape therein, in contact with a nonwoven fabric, and to heat the assembly to melt the polyethylene and cause it to form into small globules adhered to the surface of the fabric. The sizes, shapes and masses of these globules, however, differ widely and they are not distributed uniformly but in a somewhat haphazard manner on the fabric; moreover, their adhesion thereto is but slight.

According to the present invention, a method of applying to one surface of a sheet or lamination of a material, preferably but not exclusively a textile material, a more or less uniform arrangement of a potentially adhesive thermoplastic material, is to provide an open network of the thermoplastic material having a desired melting temperature, in sheet form, of desired gauge, which comprises solid uniform and similarly shaped thick masses arranged at uniform spacings and each of which is connected to the adjacent thick solid masses by strands, bands, threads or the like, hereinafter termed "strands," which are thinner, in most cases much thinner, than the solid portions and which also act as "spacers" to keep the said solid portions uniformly spaced apart.

This sheet thermoplastic open network is firmly adhered to one surface of the lamination of textile or other material by means to press the open network on to said surface, and means operating for a short period, which may be a fraction of a second, to supply sufficient heat to fuse the thermoplastic open network whilst it is subjected to such pressure, of such nature that the spacing of the thick solid masses is maintained whilst they, in a softened molten condition, are pressed on and firmly adhered to the surface of the lamination.

The lamination with the uniformly spaced potentially adhesive thick solid masses thereon, may subsequently have another lamination of suitable material, flexible or otherwise, secured thereto to form a "sandwich" lamination by means of pressure and heat, which latter fuses the said masses to cause the additional lamination to be adhered to the first.

According to a further method of the invention, whilst the open network of thermoplastic material having the uniformly spaced thick masses and interconnecting thin strands is being adhered to the first lamination by pressure and heat, it is simultaneously being adhered to another lamination of suitable material by pressure and heat, to form a sandwich laminate. In this case, however, the said open network is located between the two laminations whilst they are undergoing the pressure and thermoplastic fusing heating.

The open networks of thermoplastic material utilised in the processes according to the present invention may be formed in many ways, including moulding, the laying of spaced strands or threads of desired cross-section on to other similarly spaced strands or threads arranged at a suitable angle, for instance a right angle, to the first-mentioned spaced strands or threads, and integrating the strands or threads at the crossing areas, or the weaving together of such strands or threads.

In many instances, however, it is preferred to provide open networks as set out in the specification of United States Patent No. 3,137,746 granted to Smith & Nephew Research Limited (an associated company of Smith & Nephew Plastics Limited, the assignees of all rights in the present application), or in the specification of co-pending United States patent application Ser. No. 391,215 filed Aug. 21, 1964 and assigned to T. J. Smith & Nephew Limited (another associated company of the above-mentioned Smith & Nephew Plastics Limited). In these cases what above have been termed the uniformly spaced thick masses are the projections or bosses, and these have a "thickness" greater than that of the radiating strands; moreover, the strands in these cases have been subjected to stretching in their formation.

The open network of thermoplastic material, which comprises the uniformly spaced thick masses and interconnected thin strands, and the lamination, when it is a fabric sheet, which is to be provided with the uniformly spaced similar masses of thermoplastic material on one surface, may be subjected to the action of a turning hot roller (which may be hollow and heated from the interior), with the fabric against the roller and the open network on the exterior of the fabric (with the masses projecting outwardly) and, in the heating zone of the hot roller, with the net supported by a correspondingly moving thickness of suitable foamed material or the deep and close pile of a suitable fabric or "carpet" which is kept cold and which is caused to press with a relatively light pressure on the projecting masses of the open network to keep the said masses at the uniform spacing while the open network is being heated to soften and melt the said masses and to press and bond them on to the fabric surface.

The temperature of the hot roller is related to that of the melting or softening point of the thermoplastic material, and the arrangement is such that the heat in the operative position softens and melts the strands of the open network so that, as they are subject to little if any pressure, they shrink back into the said masses.

In the result, similar masses in a uniform pattern of "blobs" of the thermoplastic material are left on and securely adhered to the surface of the fabric, which latter is thus made potentially adherable to the surface of any other suitable fabric or other lamination to which it is to be united.

In order that the invention may be better understood, it will now be described with reference to the accompanying drawings which are given by way of example only and in which:

FIG. 1 is a plan of a portion of an open network of thermoplastic material in sheet form, to an enlarged scale, comprising thick solid areas to form bosses, connected by relatively thin strands, suitable for use in the present invention.

FIG. 2 is a fragmentary perspective view of one of the bosses seen in FIG. 1, with integral thin strand portions.

FIG. 3 is a sectional view of such bosses and aligned strands.

FIGS. 4, 5 and 6 are similar views to FIGS. 1, 2 and 3, but showing another pattern of open network of thermoplastic material.

FIG. 7 shows in plan, and FIG. 8 in side elevation, another open network of thermoplastic material of a similar type to that shown in FIGS. 1 and 4.

FIG. 9 is a sectional view of a boss and adjacent strands of the network shown in FIGS. 7 and 8.

FIG. 10 shows in elevation, and FIG. 11 in plan, another form of open network of thermoplastic material in sheet form, to an enlarged scale, comprising spaced parallel strands of rectangular section overlaying and made integral with similar strands at right angles thereto, to form solid thick areas at the crossing positions connected by relatively thin strands, suitable for use in the present invention.

FIG. 12 shows in elevation a view similar to FIG. 10 but with the rectangular-section strands interwoven in place of being overlaid.

FIG. 13 is a sectional elevation on the diagonal line of FIG. 11, of the superposed strands at one of the thick solid areas of the net, to show the greater thickness thereof as compared to the thickness of a strand.

FIGS. 14, 15, 16 and 17 are similar views to FIGS. 10 to 13, of other open networks of thermoplastic material in sheet form but where the strands are of circular section in place of being rectangular.

FIG. 18 shows to a larger scale a plan view of an open network similar to that shown in FIG. 1 and which is a line drawing made from a photomicrograph of an open network produced in accordance with patent application No. 391,215 hereinbefore referred to.

FIG. 19 shows to approximately the same scale as FIG. 18, another line drawing made from a photomicrograph, of a lining material formed from plain-weave bleached cotton cloth, having securely adhered thereto an array of uniformly spaced "blobs," that is, masses, of thermoplastic material produced by a method in accordance with the invention from an open network substantially as shown in FIG. 18.

FIG. 20 is a diagrammatic side elevation to a small scale, of a machine for carrying into effect one method according to the invention.

FIG. 21 is a fragmentary vertical section to a very greatly enlarged scale, of a portion of the machine shown in FIG. 20, to illustrate and render explicit a particular method of carrying the present invention into effect.

FIGS. 22 to 26 are other diagrammatic side elevations, to a small scale, of portions of machines for carrying into effect other methods in accordance with the invention.

FIG. 27 shows to a still smaller scale, a diagrammatic perspective view of a general "lay-out" for carrying out embodiments of the present invention, as a continuous process starting from the thermoplastic material as it is ready for extruding and extending up to the finished products in desired forms.

FIGS. 1 to 17 of the drawings show open networks of suitable thermoplastic material which have thick solid masses arranged at uniform spacings and each of which is connected to the adjacent thick solid masses by strands, bands, threads or the like, hereinafter termed "strands," which are thinner, in most cases much thinner, than the solid masses.

It should be pointed out that the strands not only connect the solid masses in the structures but, for the purpose of the present invention, act as preliminary "spacers" to position said solid masses when they are about to be heated to bring them to an adhesive condition, in the processes according to the present invention.

The networks will now be briefly described.

The open network in FIGS. 1 to 3 has thick solid hexagon-shaped bosses 28 in staggered rows interconnected, between the flat sides at the bases, by thin strands 29 to leave triangular openings 30 between the strands; each boss 28, it will be observed, has six strands extending from its flat sides. In FIGS. 4 to 6, square-shaped bosses 31 have their strands 32 between the flat sides at their bases, to leave square openings 33, and each boss will be seen to have four strands extending from its flat sides.

The open network in FIGS. 7, 8 and 9 is generally similar to that shown in FIGS. 4 to 6, except that it has thick bosses 34 of circular section connected by thin strands 35 at their bases to leave square openings 36.

The open network shown in FIGS. 10, 11 and 13 is made up from strands 37 of rectangular section which are laid parallel at uniform spacing, which are superposed on similarly laid and spaced strands 38 and integrated therewith. This leaves square spaces 39 between the strands. The arrangement is similar when the like strands such as 40 and 41 are interwoven as shown in FIG. 12.

In both instances there is a thick mass 42 where the strands cross, which thickness is indicated by T in FIG. 13 and which is double that of the strands. It should be pointed out that the masses such as 42 of thickness T are the equivalent of the thick bosses such as 28, 31 and 34 of FIGS. 1, 4 and 8 and have a similar effect to these bosses when carrying out the processes of the present invention.

FIGS. 14 and 15 show an open network similar to that shown in FIGS. 10 and 11, except that the upper strands 43 are of circular section, as also are the lower strands 44; they enclose square spaces 45. The section of the equivalent open network when strands 46 and 47 are interwoven, is shown in FIG. 16. The crossover areas of the network of FIGS. 14 and 15 or FIG. 16, are similar, and one is shown in FIG. 17. This gives a thick mass 48, the thickness being indicated by T, which has twice the thickness of a strand and is the equivalent, for the purposes of the present invention, of the thick bosses such as 28, 31 and 34 of FIGS. 1, 4 and 8.

The open network shown in FIG. 18 resembles that shown in FIG. 1 and was produced by the controlled biaxial stretching of a suitable film of thermoplastic material, for example polyethylene, having uniformly arranged rows of uniformly spaced-apart projecting bosses of hexagon shape on one surface thereof, such as set forth and described in the specification of the before-mentioned copending application No. 391,215.

In the particular example being considered, the sheet open network produced and as shown in FIG. 18 has the bosses 49 (which were originally hexagonal) of somewhat distorted hexagonal shape. These bosses were 0.4 mm. thick and 0.8 mm. across the flats, with a 2 mm. dimension between the flats of adjacent hexagons. That is, the strands designated 50 were 2 mm. long but they were much less than 0.2 mm. thick and, as will be seen, were themselves split in their lengths. However, an open network structure was formed having a weight of 18 g./sq. m., with the thick bosses 49 uniformly spaced between themselves and arranged in uniformly spaced lines.

The machine shown diagrammatically in FIG. 20 is to illustrate how so-called "fusible interlinings" and "sandwich laminates" can be made in accordance with the present invention by using open networks having uniformly disposed thick masses interconnected and spaced by thinner strands such, for example, as already set forth and described in reference to FIGS. 1 to 18.

The machine comprises a heated roller 51 to be driven in rotation and having a portion 52 of a blanket calender 53 in "nipping" engagement with a desired circumferential segment of its exterior.

This blanket calender 53 passes around rollers 54, 55 and 56 carried by side frameworks 57 (only one of which is seen in the drawing) and each being constituted by pivoted-together members, or links, one of which is formed telescopic and is controlled by tension spring means indicated by 58 and a compression spring (not shown) in the hollow member thereof.

The calender blanket is formed as indicated in FIG. 21, from a belt 59 covered with a foamed plastic material 60 of requisite compressibility, and in use the said blanket is kept cool by a blower such as 61, FIG. 20.

The heated roller 51, and which incidentally supplies heat sufficient to soften and fuse the thermoplastic material, has applied to approximately 180° or more of its surface, whilst it is in rotation, a backing or lining cloth 62 which moves with and at the same speed as the roller, and which is pulled from a bulk roll 63 to pass around a guide roller 64 to said heated roller 51. In its travel it passes to and is held forcibly in contact with the heated roller 51 by the pressure of the portion 52 of the blanket calender 53.

A let-off roller 65 has a bulk supply of an open network of thermoplastic material, for example that shown in FIG. 18, and this passes to the portion of the blanket 53 which is on the roller 54, and from this position to the nipping portion 52 of the blanket calender so that, at its entry into this nipping portion, it is gripped between the heated backing or lining cloth 62 moving with the roller 51 and the foamed portion 60 of the blanket.

Specifically, it should be noted that the outwardly projecting surfaces of the bosses 49 of the network (FIG. 18) do not contact the backing or lining cloth 62, but the underside of the network comes into contact with the said backing cloth.

FIG. 21 only shows (to an enlarged scale) a part of the nipping portion 52 of the blanket, which is just after it leaves the zone of the roller 54, and in FIG. 1 the portions of the roller 51 and blanket 59, 60 are drawn straight for convenience (and not curved) as the actual length of the portion of the blanket shown in FIG. 21 is only about 12 mm. in the example being considered. In this FIG. 21 the entering portion of the open network is represented by the projecting bosses 49 and the spacing strands 50, as set out in FIG. 18. The foamed portion 60 of the blanket presses on the outer ends or surfaces of the bosses 49 with a gripping pressure denoted by the arrows P, which either does not press on the strands 50 at all, or with a much smaller pressure. As a consequence, the heat from the roller 51, acting through the backing or lining cloth 62, fuses the thermoplastic material on to the fabric 62 in such manner that the bosses 49 adhere thereto and the thin and weak interconnecting strands 50 break apart as indicated by 66 and shrink back to increase the amount of material in the said bosses.

To the right-hand side of the break indicated by the numeral 66 in FIG. 21, the boss 49 shows the thin strand partly shrunk back and, in the next position to the right-hand side thereof, the boss with the shrunk-back strands therein is shown as a "blob" 67 which, by the pressure of the cooled foam-coated blanket, has been pressed into secure bonding contact with the base fabric 62.

In the result, the backing or lining 62 as it leaves the "nipping" portion 52 of the blanket, emerges as a fabric 62 covered with an array of regularly spaced similar "blobs" of the thermoplastic material, which is polyethylene in the example concerned, capable of being bonded to another fabric.

FIG. 19 shows a line drawing taken from a photomicrograph of a small portion of such a fabric with the similar "blobs" or masses 67 adhesively secured thereto in uniformly spaced positions, as predetermined by the strands or spacers of the original open network. The fabric 62 can be, and in the example illustrated was, a plain-weave bleached cotton cloth having a warp of 30±1 to the centimetre, a weft of 28±1 to the centimetre, and a weight of 130 g./sq. m.

This fabric (with the uniformly spaced similar masses thereon) in the machine of FIG. 20 is represented by the reference numeral 68 and either passes as shown by the dotted lines to a take-up roller 69 for storage and future use as a fusible interlining, or passes still further circumferentially along, in pressure contact with and at the same speed as the roller 51, to the position of a soft nipping roller 70 where, by the heat from the roller 51 and in the material, it is heat-bonded to another fabric 71 from a bulk roller 72 thereof. From the nip roller 70, the sandwich laminate 73 thus formed passes to a take-up roller 74.

FIG. 22 indicates another and simple method of carrying the invention into effect for forming a fusible interlining or the like. In this figure, 75 is a heated roller with a smooth surface and 76 a cooled roller with an outer surface 77 of a suitable foamed material. These are driven rollers having a soft nipping action, and the flexible lamination 78, for instance a backing or lining material, is passed in contact with the open network 79 having the uniformly spaced thick masses at the junctions such, for example, as those shown in FIGS. 1 to 18, through the nipping rollers to form the backing or lining material 80 having the uniformly spaced masses of thermoplastic material thereon.

FIG. 23 shows an elaboration of the simple method just described in relation to FIG. 22 and in which the flexible lamination 81 is held in tension on and moves with and at the same speed as the heated roller 82, the angle of contact being large, for example, as shown, approximately 270°, before reaching the soft nipping position between the roller 82 and a cooled roller 83 with a covering 84 of foamed material. The open network 85 has a desired angle of pressure contact with the cooled roller 83 before reaching the nipping position; the finished fusible interlining 86 having the uniformly spaced masses of thermoplastic material thereon, passes to a storage roll (not shown) or to a position where it is heat-laminated to another facing lamination.

With the method of carrying the invention into effect shown in FIG. 24, the base fabric 87 has pressure contact with a desired segment of the heating roller 88 before reaching the soft nipping position between said roller 88 and a cooled roller 89 with a covering 90 of foamed material. The open network 91 passes directly to the nipping position and, after this nipping position, the backing 92 having the uniformly spaced masses of thermoplastic material thereon, passes partly around a guide roller 93 to another foam-covered cooling roller 94 to a storage roll or otherwise.

Where it is not desired to pass the material on which the uniformly spaced masses of thermoplastic material are to be disposed, for example a fabric with a pile (such as velvet), through a heated nipping position, then the heat may be applied in other manners one of which is indicated in FIG. 25. In this figure, 95 is a cooled driven roller with a covering 96 of a suitable foamed material, around which passes in contact with 180° of the surface, the open network 97 travelling in contact with the fabric 98 and both under tension, to hold them pressed together as they move round with the roller. As will be seen, the lower part of the roller 95 is within a tank or container 99 having disposed therein a number of nozzles 100 for directing onto the material 98 jets of hot gas, for example air or dry steam, which will not have a deleterious effect on the material, so that the heat will cause the necessary fusing of the open network 97 and the net will be caused to adhere to the fabric by the pressure contact of the materials with and when passing round the roller 95. In this manner the material 101 is constituted, having the uniformly spaced masses of the thermoplastic on the surface which does not have the pile.

In a somewhat similar method a sandwich laminate could be formed, but in this case the network such as 97 would be between two other materials so that the three materials in contact would pass round the roller such as 95. In this case it need not be cooled but could be heated and even the foam covering such as 96 could be omitted.

In FIG. 26 another construction is indicated for carrying the method of the invention into effect where the open network 102 is included directly between two laminations 103 and 104 each of which passes on to and moves in pressure contact with an associated heating roller 105 and 106, respectively, the two rollers having a nipping position.

By the heat and pressure, the open network 102 is fused to form a sandwich laminate 107 which passes round cooling rollers 108 and 109, the latter of which can be driven.

In this method and similar methods, the uniformly spaced masses of the thermoplastic material are fused to unite themselves with both exterior laminations such as 103 and 104.

As a variation of the arrangement shown in FIG. 26, in some cases the roller 108, in place of being a cooling roller could be a heating roller in nipping engagement with the heating roller 105, to consolidate the sandwich laminate 107 which is cooled by the cooling roller 109.

FIG. 27 shows a diagram of a complete layout for a continuous process according to the invention, from the formation of a sheet from the mix of thermoplastic material to the end steps of the process. The parts for these end steps are the same as those set forth in FIG. 20 and are given the same reference numerals. At the commencement of the process, the thermoplastic mass may be heated and extruded through a flat nozzle for thinning and spreading to the required gauge and width, by calendering or other rollers. However, for simplicity's sake it is shown in the drawing in a hopper 110 and issuing from the under side of a doctor blade 111 as a sheet 112 on to an endless travelling band (not shown) in any usual manner. This sheet has to have formed on one surface thereof uniformly spaced rows of spaced-apart projecting bosses to form the starting material for the formation of open network structures such as set forth in the patent and copending application for a patent already referred to herein.

For this purpose, in a suitable position there is provided a pair of driven rollers 113 and 114 which emboss one surface of the sheet 112, so that it travels on as a suitably embossed sheet 115.

At the next stage, it is subjected to biaxial stretching, according to any suitable method, for example any of the methods as set forth in the above-mentioned patent or copending application for a patent. As illustratd in the diagram, the longitudinal stretch is given by two pairs of draw rollers 116, 117 and 118, 119, the last pair of which have a greater peripheral speed than the first pair. The transverse stretch is given by any suitable "stentering" apparatus, not shown but which causes the divergence of the edges of the thermoplastic sheet material passing through the machine as indicated by the shaped portion 120 of said material located between the rollers 116, 117 and 118, 119, to form the open network indicated by 121 which, as hereinbefore set forth, has thick projecting bosses at the junctions, interconnected by thin strands and such, for example, as generally indicated in FIGS. 1, 4 and 7 and a specific example of which is shown in FIG. 18.

The open network 121 passes on to the nipping position between the blanket 53 and the heated roller 51, and then the action is the same as that described in relation to FIG. 20 but where the open network proceeded from the bulk roller 65 thereof.

The open network for use in the methods of the present invention may be made from any suitable thermoplastic material, for example polyethylene and copolymers thereof.

They may be of any suitable gauge measured over the thick parts, for example within the range 0.001" to 0.025".

Their fusing temperatures may be within the range 80° C. to 160° C.

In most cases the area of the spaces of the open network used in the methods of the invention, is much greater than the area of the thick solid masses thereof. The mesh of the net, of course, can also be as desired, and vary from a "fine" mesh to a "coarse" mesh. Further, the shape and arrangement of the openings may be as desired.

The lamination, which has the similar masses adhered thereto, can be of any material which is suitable for the purpose for which the said lamination with its adherent masses is to be used.

For example, when it is for use to stiffen or reinforce certain fabrics, such as in the making-up of men's shirts, collars and the like, then the lamination can be a plain-weave cotton, which may be closely woven, or it could be a nonwoven fabric.

However, when it is to be used as a lightweight flexible lining, the said lamination can be of acetate tricot or other similar lightweight material, suitable for lining outer fabrics such as woven "dogs tooth" rayon (for example), especially as these materials are widely used in the clothing industry for women's skirts and suits. Such sandwich laminates are flexible, air-pervious and will withstand dry-cleaning and laundering.

Other fabrics suitable for being made into laminates according to the methods of the invention include woven, knitted or bonded materials, of wool, cotton, nylon, regenerated cellulose, cellulose acetate, polyester, various kinds of paper, acrylic and vinyl fibers.

Laminates made in accordance with the invention may be used for a variety of purposes. For example, they can be utilised for the formation of garments for personal wear, soles for slippers and other footwear, for floor coverings such as "foam-backed" carpets, table covers, upholstery, chair and seat covers, or otherwise.

Although laminating methods and laminates according to the invention are in the main concerned with uniting flexible materials, the invention must not be regarded as limited to using only such materials, and in some cases will be concerned with laminates having one, some or the whole of the laminations (except possibly for the network lamination or laminations) of wholly stiff or bendably rigid material, provided that such material is not adversely affected by the necessary heating to fuse the open network. Further, in some cases the material must be able to transmit heat and not be adversely affected thereby.

What I claim is:

1. A method of producing laminae having a multiplicity of patches of thermoplastic material substantially uniformly distributed over and adhering to a side surface of at least one backing sheet, said method including the steps of placing said backing sheet in surface to surface relationship with an openwork thermoplastic net structure comprising a multiplicity of substantially uniformly spaced, similarly shaped thick portions interconnected by substantially thinner strand-like portions, pressing said backing sheet and net structure against each other with sufficient force to establish solid contact between said backing sheet and said thick portions of the net structure, and applying heat to cause fusion of said thick portions of the net structure with said backing sheet and disruption of said thinner portions of the thermoplastic net structure so that said disrupted thinner portions shrink back into said thick portions, and cooling said thermoplastic so as to retain said thick portions as discrete patches on the surface of the backing sheet.

2. The method set forth in claim 1, including the step of moving said backing sheet and net structure together in contact with a circumferential section of a heated roller which moves at a circumferential velocity equal to the linear speed of said backing sheet and net structure, so that said fusion occurs during the movement through said circumferential section.

3. The method set forth in claim 1, including the steps of moving said backing sheet and net structure together in contact with a circumferential section of a roller which moves at a circumferential velocity equal to the linear speed of said backing sheet and net structure, and applying the heat by causing a flow of hot gas through said backing sheet and net structure.

4. The method set forth in claim 2, including the step of moving said backing sheet in contact with said heated roller for some distance before bringing the net structure into contact therewith.

5. The method set forth in claim 1, including the step of applying the pressure by means of a member having a cushioning surface layer, whereby to cause said thick portions of the net structure to be securely bonded to the backing sheet and to facilitate shrinking back of said thinner portions of the net structure.

6. The method set forth in claim 5, in which said cushioning surface layer comprises a soft foam material.

7. A method of producing laminae having a multiplicity of patches of thermoplastic material substantially uniformly distributed over and adhering to opposed side surfaces of two backing sheets, said method including the steps of placing each of said backing sheets in surface to surface relationship with one side of an openwork thermoplastic net structure comprising a multiplicity of substantially uniformly spaced, similarly shaped thick portions interconnected by substantially thinner strand-like portions, pressing said backing sheets and net structure against each other with sufficient force to establish solid contact between said backing sheets and said thick portions of the net structure, and applying heat to cause fusion of said thick portions of the net structure with said backing sheets and disruption of said thinner portions of the thermoplastic net structure so that said disrupted thinner portions shrink back into said thick portions, and cooling said thermoplastic so as to retain said thick portions as discrete patches between said backing sheets.

8. The method set forth in claim 7, including the step of moving said backing sheets and net structure together in contact with a circumferential section of a heated roller which moves at a circumferential velocity equal to the linear speed of said backing sheets and net structure, so that said fusion occurs during the movement through said circumferential section.

9. The method set forth in claim 7, including the step of moving said backing sheets and net structure together in contact with a portion of the circumference of a roller which moves at a circumferential velocity equal to the linear speed of said backing sheets and net structure, and applying the heat by causing a flow of hot gas through said backing sheets and net structure.

10. The method set forth in claim 8, including the step of heating the backing sheets prior to bringing them into contact with said thermoplastic net structure.

11. A method of producing laminae having a multiplicity of patches of thermoplastic material substantially uniformly distributed over and adhering to a side surface of at least one backing sheet, said method including the steps of placing said backing sheet in surface to surface relationship with an openwork thermoplastic net structure comprising a multiplicity of substantially uniformly spaced, similarly shaped thick portions interconnected by substantially thinner strand-like portions, pressing said backing sheet and net structure against each other by means of a member having a cushioning surface layer and with sufficient force to press said thick portions of the net structure partly into the adjacent surface of the backing sheet, and applying heat to cause fusion of said thick portions of the net structure with said backing sheet and disruption of said thinner portions of the thermoplastic net structure so that said disrupted thinner portions shrink back into said thick portions, and cooling said thermoplastic so as to retain said thick portions as discrete patches on the surface of the backing sheet.

References Cited

UNITED STATES PATENTS

| | | | |
|---|---|---|---|
| 3,307,990 | 3/1967 | Homier et al. | 161—81 X |
| 3,245,854 | 4/1966 | Etchison et al. | 161—81 X |
| 3,137,746 | 6/1964 | Seymour et al. | 264—287 X |
| 2,706,699 | 4/1955 | Plansoen et al. | 161—89 X |
| 2,603,575 | 7/1952 | Schramm | 161—159 X |
| 2,335,222 | 11/1943 | Storch | 161—97 X |
| 2,224,370 | 12/1940 | Wescott. | |

ROBERT F. BURNETT, *Primary Examiner.*

M. A. LITMAN, *Assistant Examiner.*

U.S. Cl. X.R.

156—155, 245, 276, 306; 161—87, 148